(12) United States Patent
Rosar (10) Patent No.: US 9,473,926 B2
(45) Date of Patent: Oct. 18, 2016

(54) METHODS, SYSTEMS, AND COMPUTER READABLE MEDIA FOR SUPPORTING LOCAL BREAKOUT

(71) Applicant: Oracle International Corporation, Redwood Shores, CA (US)

(72) Inventor: Werner Richard Rosar, Darmstadt (DE)

(73) Assignee: Oracle International Corporation, Redwood Shores, CA (US)

( * ) Notice: Subject to any disclaimer, the term of this patent is extended or adjusted under 35 U.S.C. 154(b) by 498 days.

(21) Appl. No.: 13/943,764

(22) Filed: Jul. 16, 2013

(65) Prior Publication Data

US 2015/0050937 A1  Feb. 19, 2015

(51) Int. Cl.
*H04W 40/00* (2009.01)
*H04W 8/08* (2009.01)

(52) U.S. Cl.
CPC .................................. *H04W 8/082* (2013.01)

(58) Field of Classification Search
None
See application file for complete search history.

(56) References Cited

U.S. PATENT DOCUMENTS

| 8,295,830 B1 | 10/2012 | Faccin | |
|---|---|---|---|
| 2011/0173332 A1* | 7/2011 | Li | H04L 12/14 709/227 |
| 2011/0176531 A1* | 7/2011 | Rune | H04W 76/041 370/338 |
| 2011/0225632 A1* | 9/2011 | Ropolyi | H04W 48/16 726/4 |
| 2012/0042058 A1* | 2/2012 | Shaikh | H04L 29/12188 709/222 |
| 2012/0106508 A1* | 5/2012 | Zhou | H04M 15/00 370/331 |
| 2013/0151845 A1* | 6/2013 | Donovan | H04L 63/0407 713/153 |

FOREIGN PATENT DOCUMENTS

| EP | 2 053 824 A1 | 4/2009 |
|---|---|---|
| EP | 2 451 201 A1 | 5/2012 |
| EP | 2 827 625 A1 | 1/2015 |
| WO | WO 2010/076044 A1 | 7/2010 |

OTHER PUBLICATIONS

"EU Roaming regulation III, Structural Solutions, High Level Technical specifications," Draft Version 0.8, pp. 1-64 (May 17, 2013).
"Regulation (EU) No. 531/2012 of the European Parliament and of the Council of Jun. 13, 2012 on roaming on public mobile communications networks within the Union," Official Journal of the European Union, pp. 1-26 (Jun. 30, 2012).
Extended European Search Report for European Application No. 14176595.8 (Dec. 22, 2014).
Communication pursuant to Article 94(3) EPC for European Application No. 14 176 595.8 (Mar. 18, 2016).

* cited by examiner

Primary Examiner — Shantell L Heiber
(74) Attorney, Agent, or Firm — Jenkins, Wilson, Taylor & Hunt, P.A.

(57) ABSTRACT

Methods, systems, and computer readable media for supporting local breakout (LBO) are disclosed. According to one aspect, the subject matter described herein includes a method for supporting LBO. The method occurs at a signaling platform. The method includes receiving a signaling message associated with a roaming subscriber. The method also includes determining whether a roaming provider is appropriate for performing an LBO service. The method further includes in response to determining that the roaming provider is appropriate for performing the LBO service, forwarding the signaling message to a destination, wherein the signaling message includes control information for performing the LBO service.

16 Claims, 8 Drawing Sheets

METHODS, SYSTEMS, AND COMPUTER READABLE MEDIA FOR SUPPORTING LOCAL BREAKOUT

TECHNICAL FIELD

The subject matter described herein relates to methods and systems for subscriber mobility. More particularly, the subject matter described herein relates to methods, systems, and computer readable media for supporting local breakout.

BACKGROUND

Local breakout (LBO) is a technique wherein a user data flow is diverted from its usual expected call flow through a home network and, instead, is routed through another network. For example, when LBO occurs, data services for a mobile subscriber may be handled by a network (e.g., a visited mobile network when a mobile subscriber travels to a foreign country) which may or may not have a business and operational relationship with the home network operator of the subscriber.

Some countries and/or international bodies have enacted regulations for allowing local breakout and alternative roaming providers for individual subscribers. For example, the European Union (EU) has enacted regulation number 531-2012 that requires mobile network operators to allow subscribers in member countries to purchase EU roaming packages from any ARP for billing charges related to voice, messaging, and mobile data services. The subscriber's home network must be capable of allowing the ARP to provide data service, e.g., via LBO. To support ARPs and LBO for individual subscribers, mobile network operators may need to modify network infrastructure and/or network configuration and may attempt to perform such modification in an efficient and cost effective manner.

Accordingly, there exists a need for methods, systems, and computer readable media for supporting local breakout.

SUMMARY

Methods, systems, and computer readable media for supporting local breakout (LBO) are disclosed. According to one aspect, the subject matter described herein includes a method for supporting LBO. The method occurs at a signaling platform. The method includes receiving a signaling message associated with a roaming subscriber. The method also includes determining whether a roaming provider is appropriate for performing an LBO service. The method further includes in response to determining that the roaming provider is appropriate for performing the LBO service, forwarding the signaling message to a destination, wherein the signaling message includes control information for performing the LBO service.

According to another aspect, the subject matter described herein includes a system for supporting LBO. The system includes a signaling platform. The signaling platform includes at least one processor and memory. The signaling platform also includes an LBO module configured to receive a signaling message associated with a roaming subscriber, to determine whether a roaming provider is appropriate for performing an LBO service; and in response to determining that the roaming provider is appropriate for performing the LBO service, to forward the signaling message to a destination, wherein the signaling message includes control information for performing the LBO service.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors and memory.

As used herein, the terms 'function' or 'module' refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for supporting local breakout (LBO). Some aspects of the subject matter described herein include techniques and mechanisms for analyzing a signaling message and for determining whether an alternate roaming provider (ARP) (e.g., a provider other than a subscriber's home network operator or provider) is allowed to provide data services and/or other services (e.g., voice or messaging) to a roaming subscriber.

In some embodiments, a signaling platform (e.g., a computing platform or device for handling signaling messages) in accordance with some aspects of the subject matter described herein may be configured to receive or intercept a signaling message (such as a mobility management message) that includes LBO- and/or ARP-related information, e.g., a parameter or other information indicating that an ARP is selected or identified. The signaling platform may determine, using information in the signaling message and/or other information (e.g., information about an originating network and a destination network) whether the ARP is appropriate (e.g., allowed or prohibited) for LBO service.

In some embodiments, a signaling platform in accordance with some aspects of the subject matter described herein may be configured to receive or intercept a signaling message (such as a mobility management message) associated with a roaming subscriber, e.g., a mobile application part (MAP) insert subscriber data (ISD) message. The signaling platform may determine, using information in the signaling message and/or other information (e.g., information about an originating network and a destination network) whether an ARP is appropriate.

In some embodiments, in response to determining that an ARP is appropriate or not appropriate, a signaling platform in accordance with some aspects of the subject matter described herein may be configured to add, delete, or modify a signaling message. For example, a signaling platform in accordance with some aspects of the subject matter described herein may determine a network (e.g., a home network and/or a visited network) associated with a subscriber. If the associated network allows ARPs to provide data services or other services for roaming subscribers, the signaling platform may forward a signaling message that includes control information associated with the LBO service. If the associated network prohibits ARPs from providing data services or other services for roaming subscribers, the signaling platform may remove or modify ARP information contained in a signaling message before forwarding the signaling message.

In some embodiments, a signaling platform in accordance with some aspects of the subject matter described herein for supporting LBO may provide various advantages or benefits. For example, a signaling platform may be more easily provisioned and/or configured since some pre-existing functionality (e.g., filtering and/or global title translation (GTT) functions) may be used in identifying relevant signaling messages associated with roaming subscribers. Further, by supporting LBO at a signaling platform, other nodes (such as location registers) may need little or no additional modification.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
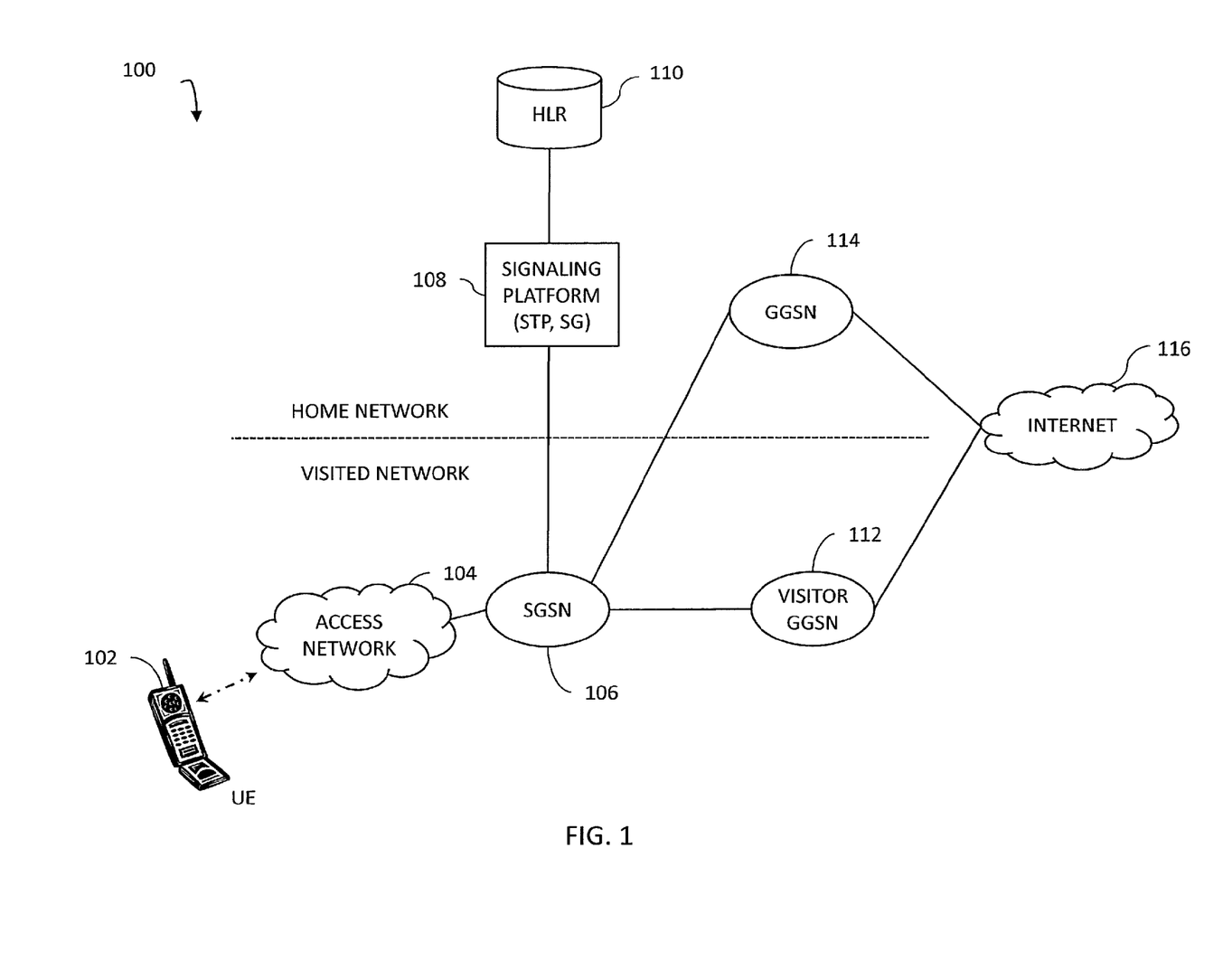
FIG. 1 is a diagram illustrating an exemplary home network and a visited network for supporting LBO according to an embodiment of the subject matter described herein.

FIG. 1 is a diagram illustrating an exemplary network for supporting LBO according to an embodiment of the subject matter described herein. FIG. 1 includes a UE 102 (e.g., a mobile device, a tablet computing platform, or a smartphone) capable of roaming or moving between different portions of a network 100. In some embodiments, network 100 may include one or more nodes associated with a third generation (3G) network and/or a second generation (2G) network.

Network 100 may include a home network (e.g., a home public land mobile network (HPLMN)) and a visited network (e.g., a visited public land mobile network (VPLMN)). The home network may be associated with UE 102 and may be the UE's default network, while the visited network may be a network that UE 102 may use or may attempt to use while roaming outside the home network's coverage area. In some embodiments, the home network and the visited network may include nodes for communicating with an external network, such as Internet 116.

The home network may include various nodes, including a serving general packet radio service (GPRS) support node (SGSN) 114, a signaling platform (SP) 108, and a home location register (HLR) 110. In some embodiments, a home network may be configured as a subscriber's default roaming provider. In some embodiments, a home network may be configured to allow a subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access) using LBO service. For example, an ARP may provide data services at lower rates than a subscriber's home network and may also help in alleviating network load or congestion in the subscriber's home network by handling some subscribers' IP traffic.

In some embodiments, LBO may be enabled by default for EU subscribers roaming into an EU country. In some embodiments, to support default LBO for EU subscribers, HLR 110 may send signaling messages (e.g., MAP ISD messages) with 'VPLMN Address Allowed' flags for EU Internet APNs to visited networks in EU countries. In some embodiments, to support default LBO for EU subscribers, 'VPLMN Address Allowed' flags may be added to signaling messages for EU Internet APNs. For example, an intermediate node (e.g., SP 108) between HLR 110 and a serving GPRS support node (SGSN) 106 may add a 'VPLMN Address Allowed' flag to a signaling message if the roaming scenario is appropriate.

GGSN 114 may be any suitable entity for providing access to Internet 116 or other data networks, e.g., an Internet access point. In some embodiments, if SGSN 106 receives a signaling message indicating that a roaming subscriber cannot receive data services via an ARP (e.g., using LBO), SGSN 106 may route IP traffic and/or related messages destined for Internet 116 via GGSN 114 in the home network.

HLR 110 may represent any suitable entity for maintaining and/or providing one or more subscriber data management (SDM) or customer relationship management (CRM) functions. HLR 110 may maintain subscriber-related information, such as user identification, control information for user authentication and authorization, location information, and user profile data. For example, HLR 110 may include a database containing details about a subscriber identity module (SIM) card associated with UE 102, services available to UE 102, and the current location (e.g., current serving node) of UE 102.

In some embodiments, HLR 110 may perform mobility management procedures in response to receiving a MAP message or other messages. Mobility management messages may be received from SGSN 106 or other nodes in network 100.

SP 108 may be any suitable entity (e.g., one or more computing platforms or devices) for receiving, processing, routing, and/or forwarding signaling messages. In some embodiments, SP 108 may include a gateway, a signaling router, a signal transfer point (STP), a signaling system number 7 (SS7) node, or a signaling node.

In some embodiments, SP 108 may include functionality for facilitating communications between nodes in the home network and nodes in the visited network. For example, mobility management messages and/or registration related messages may be sent from SGSN 106 to HLR 110 via SP 108.

In some embodiments, SP 108 may include functionality for filtering signaling messages and/or performing global title translation (GTT). For example, SP 108 may analyze header information in signaling messages and may determine how to process or route the signaling messages. In this example, some filtering may include determining whether a signaling message is addressed to an appropriate node or includes appropriate parameters or other information. GTT may include identifying an appropriate destination for a signaling message (e.g., based on global title information) and routing the signaling message to the identified destination.

In some embodiments, SP 108 may use filtering for identifying signaling messages that are associated LBO- and/or ARP-related information, such as mobility management messages from roaming subscribers. For example, SP 108 may be configured to use GTT functionality, such as filters associated with signaling connection control part (SCCP) subsystem numbers (SSNs) or MAP operation codes (opcodes) to identify relevant signaling messages. In this example, SP 108 may identify relevant signaling messages by filtering signaling messages associated with HLR 110 (e.g., a calling party (CgPN) SSN=6) and/or SGSN 106 (e.g., a called party (CdPN) SSN=149) and/or by filtering certain types of signaling messages using opcodes (e.g., MAP ISD messages may be associated with an opcode value of '7').

In some embodiments, after using one or more filters and/or performing some GTT-related analysis, SP 108 may include functionality for performing an LBO related analysis on a signaling message to identify or derive associated LBO- and/or ARP-related information. For example, SP 108 may be configured to analyze a payload portion of a signaling message and retrieve a flag or parameter for indicating an ARP may be used and/or a parameter for indicating an APN associated with an ARP.

In some embodiments, LBO related analysis may include determining whether LBO- and/or ARP-related information in a signaling message is appropriate (e.g., whether an ARP or LBO is allowed by a subscriber's home network). In some embodiments, determining whether LBO- and/or ARP-related information in a signaling message is appropriate may be based on or affected by various factors, such as a home network location, a visited network location, a network condition, a service agreement, a subscriber tier, a device type, a time of day, a requested service, a QoS requirement, and/or a QoE requirement.

In some embodiments, SP 108 may be configured to modify, delete, and/or add LBO- and/or ARP-related information. For example, if SP 108 determines that a signaling message includes an APN parameter that is associated with a prohibited ARP, SP 108 may delete the APN parameter. In another example, if SP 108 determines that a signaling message includes an APN parameter that is associated with an allowed ARP, SP 108 may forward the signaling message to the visited network without changing the APN parameter. In yet another example, if SP 108 determines that a signaling message should include LBO- and/or ARP-related information, SP 108 may modify the signaling message to include an APN prior to forwarding the signaling message.

The visited network may include an access network 104, SGSN 106, and a GGSN 112. Access network 104 may represent a radio access network and may include various nodes for communicating with UE 102 and elements within network 100. Exemplary nodes in access network 104 may include a node B (NB), a radio network controller, a base station, or other transceiver node, which may perform radio access functions. Access network 104, or nodes therein, may be used for communications between UE 102 and nodes in the visited network or network 100. For example, an NB or other node (e.g., a gateway) may communicate UE-related messages (e.g., authentication or mobility related messages) to SGSN 106 or other nodes.

SGSN 106 may represent any suitable entity for performing one or more mobility management functions, such as tracking UE 102. In some embodiments, SGSN 106 may communicate information (e.g., mobility-related information) to other nodes in network 100. For example, SGSN 106 may receive registration requests from a transceiver node in access network 104 and may communicate with HLR 110 for performing authentication and/or for updating the current location of the subscriber. Additionally, SGSN 106 may communicate with various other nodes and perform various other functions.

GGSN 112 may be any suitable entity for providing access to Internet 116 or other data networks, e.g., an Internet access point. In some embodiments, if SGSN 106 receives a signaling message indicating that a roaming subscriber can receive data services via an ARP (e.g., using LBO), SGSN 106 may route IP traffic and/or related messages destined for Internet 116 via GGSN 112 in the visited network.

In some embodiments, if SGSN 106 receives a signaling message indicating that a roaming subscriber cannot receive data services via an ARP (e.g., using LBO), SGSN 106 may route IP traffic and/or related messages destined for Internet 116 via GGSN 114 in the home network.

Figure 2:
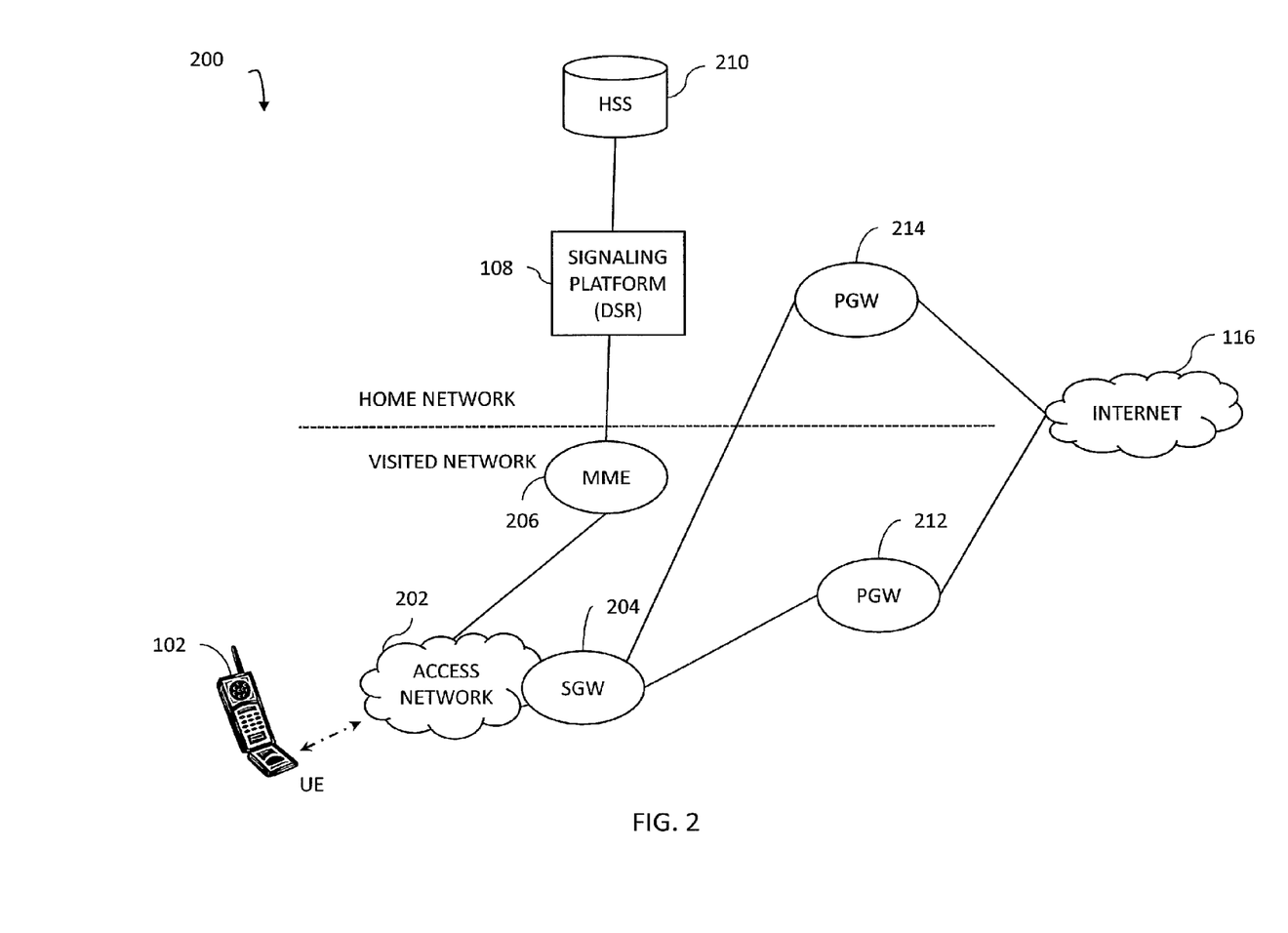
FIG. 2 is a diagram illustrating an exemplary home network and a visited network for supporting LBO according to another embodiment of the subject matter described herein.

FIG. 2 is a diagram illustrating an exemplary network for supporting LBO according to another embodiment of the subject matter described herein. FIG. 1 includes a UE 102 (e.g., a mobile device, a tablet computing platform, or a smartphone) capable of roaming or moving between different portions of a network 200. In some embodiments, network 200 may include one or more nodes associated with a fourth generation (4G) network, a long term evolution (LTE) network, a LTE-advanced network, and/or an evolved packet core (EPC) network.

Network 200 may include a home network (e.g., an HPLMN) and a visited network (e.g., a VPLMN). The home network may be associated with UE 102 and may be the UE's default network, while the visited network may be a network that UE 102 may use or may attempt to use while roaming outside the home network's coverage area. In some embodiments, the home network and the visited network may include nodes for communicating with an external network, such as Internet 116.

The home network may include various nodes, including a packet gateway (PGW) 214, SP 108, and a home subscriber server (HSS) 210. In some embodiments, a home network may be configured as a subscriber's default roaming provider. In some embodiments, a home network may be configured to allow a subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access) using LBO service. For example, an ARP may provide data services at lower rates than a subscriber's home network and may also help in alleviating network load or congestion in the subscriber's home network by handling some subscribers' IP traffic.

In some embodiments, LBO may be enabled by default for EU subscribers roaming into an EU country. In some embodiments, to support default LBO for EU subscribers, HSS 210 may send signaling messages (e.g., a Diameter Insert-Subscriber-Data-Request (IDR) message or a Diameter Update-Location-Answer message) with 'VPLMN-Dynamic-Address-Allowed' attribute value pairs (AVPs) for EU Internet APNs to visited networks in EU countries. The 'VPLMN-Dynamic-Address-Allowed' AVP may indicate that a VPLMN address is allowed, e.g., may be set to '1'. In some embodiments, to support default LBO for EU subscribers, 'VPLMN-Dynamic-Address-Allowed' AVPs may be added to signaling messages, e.g., after being sent from HSS 210. For example, an intermediate node (e.g., SP 108) between HSS 210 and a mobility management node (MME) 206 may add a VPLMN-Dynamic-Address-Allowed' AVP to a signaling message if the roaming scenario is appropriate.

PGW 214 may be any suitable entity for providing access to Internet 116 or other data networks, e.g., an Internet access point. For example, a serving gateway (SGW) 204 may communicate with PGW 214 to provide Internet access. In some embodiments, if SGW 204 receives a signaling message indicating that a roaming subscriber cannot receive data services via an ARP (e.g., using LBO), SGW 204 may route IP traffic and/or related messages destined for Internet 116 via PGW 214 in the home network.

HSS 210 may represent any suitable entity for maintaining and/or providing one or more subscriber data management (SDM) or customer relationship management (CRM) functions. HSS 210 may maintain subscriber-related information, such as user identification, control information for user authentication and authorization, location information, and user profile data. For example, HSS 210 may include a database containing details about a subscriber identity module (SIM) card associated with UE 102, services available to UE 102, and the current location (e.g., current serving node) of UE 102.

In some embodiments, HSS 210 may perform mobility management procedures in response to receiving a Diameter message or other messages. Mobility management messages may be received from MME 206 or other nodes in network 200.

SP 108 may be any suitable entity (e.g., one or more computing platforms or devices) for receiving, processing, routing, and/or forwarding signaling messages. In some embodiments, SP 108 may include a Diameter relay agent and/or a Diameter signaling router (DRA/DSR). For example, SP 108 may route and/or forward various Diameter messages between nodes in network 200.

In some embodiments, SP 108 may include functionality for facilitating communications between nodes in the home network and nodes in the visited network. For example, mobility management messages and/or registration related messages may be sent from MME 206 to HSS 210 via SP 108.

In some embodiments, SP 108 may include functionality for filtering signaling messages. For example, SP 108 may analyze AVP information in Diameter signaling messages and may determine how to process or route the signaling messages. In some embodiments, SP 108 may use filtering for identifying signaling messages that are associated LBO- and/or ARP-related information, such as mobility management messages from roaming subscribers. For example, SP 108 may be configured to use filters associated with an application identifier (e.g., Application-ID=16777251 may indicate a S6a interface message between HSS 210 and MME 206) and/or command codes (e.g., a Diameter IDR message may be associated with a command code of '319' and a Diameter ULA message may be associated with a command code of '316'. In this example, SP 108 may be configured to identify relevant signaling messages based on such filters.

In some embodiments, after using one or more filters, SP 108 may include functionality for performing an LBO related analysis on a signaling message to identify or derive associated LBO- and/or ARP-related information. For example, SP 108 may be configured to retrieve destination realm information, a 'VPLMN-Dynamic-Address-Allowed' AVP, and/or an AVP containing an APN associated with an ARP. For example, APN information may be found in the APN-Configuration (AVP 1430) and/or Service-Selection (AVP 493) AVPs.

In some embodiments, LBO related analysis may include determining whether LBO- and/or ARP-related information in a Diameter signaling message is appropriate (e.g., whether an ARP or LBO is allowed by a subscriber's home network). In some embodiments, determining whether LBO- and/or ARP-related information in a signaling message is appropriate may be based on or affected by various factors, such as a home network location, a visited network location, a destination realm, a network condition, a service agreement, a subscriber tier, a device type, a time of day, a requested service, a QoS requirement, and/or a QoE requirement.

In some embodiments, SP 108 may be configured to modify, delete, and/or add LBO- and/or ARP-related information. For example, if SP 108 determines that a signaling message includes an APN parameter that is associated with a prohibited ARP, SP 108 may delete the APN parameter. In another example, if SP 108 determines that a signaling message includes an APN parameter that is associated with an allowed ARP, SP 108 may forward the signaling message to the visited network without changing the APN parameter. In yet another example, if SP 108 determines that a signaling message should include LBO- and/or ARP-related information, SP 108 may modify the signaling message to include an APN prior to forwarding the signaling message.

The visited network may include an access network 202, MME 204 SGW 206, and a PGW 212. Access network 202 may represent a radio access network and may include various nodes for communicating with UE 102 and elements within network 200. Exemplary nodes in access network 202 may include an evolved node b (eNB) or other transceiver node, which may perform radio access functions. Access network 202, or nodes therein, may be used for communications between UE 102 and nodes in the visited network or network 200. For example, an eNB or other node (e.g., SGW 204) may communicate UE-related messages (e.g., authentication or mobility related messages) to MME 206 or other nodes.

SGW 204 represents a node or gateway for facilitating communications between access network 202 and other nodes (e.g., PGW 212) or networks. In some embodiments, SGW 204 may communicate user traffic to other nodes in network 200.

MME 206 may represent any suitable entity for performing one or more mobility management functions, such as tracking UE 102. In some embodiments, SGW 204 may communicate information (e.g., mobility-related information) to other nodes in network 200. For example, MME 206 may receive registration requests from a transceiver node in access network 202 and may communicate with HSS 210 for performing authentication and/or for updating the current location of the subscriber. Additionally, MME 206 may communicate with various other nodes and perform various other functions.

PGW 212 may be any suitable entity for providing access to Internet 116 or other data networks, e.g., an Internet access point. In some embodiments, if SGW 204 receives a signaling message indicating that a roaming subscriber can receive data services via an ARP (e.g., using LBO), SGW 204 may route IP traffic and/or related messages destined for Internet 116 via PGW 212 in the visited network.

In some embodiments, if SGW 204 receives a signaling message indicating that a roaming subscriber cannot receive data services via an ARP (e.g., using LBO), SGW 204 may route IP traffic and/or related messages destined for Internet 116 via PGW 214 in the home network.

Figure 3:
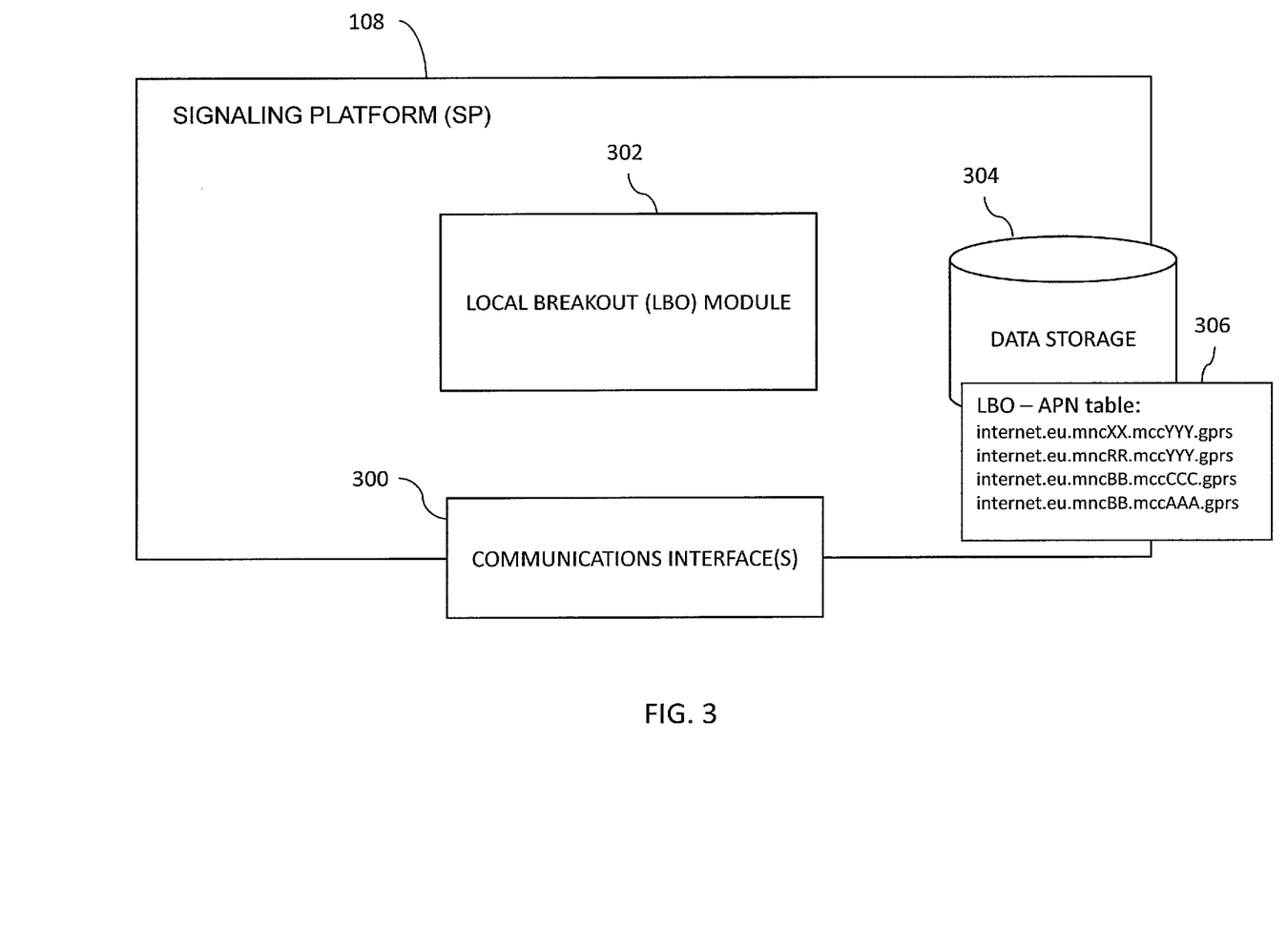
FIG. 3 is a diagram illustrating an exemplary signaling platform for supporting LBO according to an embodiment of the subject matter described herein.

FIG. 3 is a diagram illustrating exemplary SP 108 according to an embodiment of the subject matter described herein. Referring to FIG. 2, SP 108 may include one or more communications interface(s) 300 for communicating messages (e.g., via an SS7 interface, or a Diameter interface, or others). In some embodiments, communications interface(s) 300 may include a first communication interface for communicating with HLR 110 and a second communications interface for communicating with SGSN 106.

In some embodiments, communications interface(s) 300 may be associated with one or more taps (e.g., computing platforms or devices) for intercepting and/or copying signaling messages in network 100.

SP 108 may include an LBO module 302. LBO module 302 may be any suitable entity (e.g., software executing on a processor) for performing one or more aspects of the subject matter described herein, such as supporting, controlling, and/or implementing LBO. In some embodiments, LBO module 302 may be configured to determine whether LBO should be implemented for certain subscribers and/or whether LBO should be performed using certain ARPs.

LBO module 302 may include functionality for receiving a signaling message and identifying LBO- and/or ARP-related information associated with the signaling message. LBO module 302 may include functionality for determining whether LBO- and/or ARP-related information is appropriate (e.g., allowed or prohibited). LBO module 302 may include functionality for modifying signaling messages and/or generating new signaling messages based on received signaling messages. For example, if a signaling message includes LBO- and/or ARP-related information determined to be inappropriate, LBO module 302 may delete, add, or modify the LBO- and/or ARP-related information. In another example, if a signaling message includes LBO- and/or ARP-related information determined to be inappropriate, LBO module 302 may generate a new signaling message without the inappropriate LBO- and/or ARP-related information.

In some embodiments, determining whether LBO- and/or ARP-related information is appropriate may be based on or may be affected by locations associated with a home network and a visited network (e.g., an ARP network). For example, LBO module 302 may determine that a subscriber's home network and requested ARP network are in EU nations. In this example, since EU regulations require mobile networks in EU nations to allow ARPs to handle data services for roaming subscribers in other EU nations, LBO module 302 may determine that LBO- and/or ARP-related information in the signaling message is appropriate (e.g., not prohibited). In another example, LBO module 302 may determine that a subscriber's home network and requested ARP network are not both EU nations and, as such, LBO module 302 may determine that LBO- and/or ARP-related information in the signaling message is not appropriate (e.g., prohibited).

In some embodiments, determining whether LBO- and/or ARP-related information is appropriate may be based on or may be affected by network policies or service agreements. For example, LBO module 302 may determine that only ARPs in which a home network has service agreements are appropriate. In another example, LBO module 302 may determine that only ARPs meeting or exceeding certain QoE or QoS requirements are appropriate SP 108 may access (read from and/or write information to) data storage 304. Data storage 304 may be any suitable entity (e.g., a computer readable medium or memory) for storing various data. In some embodiments, data storage 304 may include rules and/or policies associated with one or more subscribers. Data storage 304 may include information for determining whether LBO should be implemented. Exemplary information usable in determining whether LBO should be implemented may include network conditions, subscriber tiers, device types, location, time of day, QoS requirements, QoE requirements, service agreements, ARP identifiers (e.g., APNs), network locations, and/or other information.

Data storage 304 may include APN data 306. APN data 306 may include APNs associated with appropriate ARPs and/or in appropriate ARPs. For example, APN data 306 may include APNs 'internet.eu.mncXX.mccYYY.gprs,' 'internet.eu.mncXX.mccYYY.gprs,' 'internet.eu.mncRR.mccYYY.gprs,' 'internet.eu.mncBB.mccCCC.gprs', and 'internet.eu.mncBB.mccAAA.gprs. In this example, each of the APN may indicate that the network being connected to is the 'Internet' and that the network operator is associated with an EU nation.

In some embodiments, a home network may store a whitelist of APNs that subscribers can use to receive data services or other services. In this example, SP 108 or another node may access APN data 306 to determine whether a subscriber is associated with an appropriate APN. If an APN associated with the subscriber is in the whitelist, the ARP may be allowed.

In some embodiments, a home network may store a blacklist of APNs that subscribers cannot use to receive data services or other services. In this example, SP 108 or another node may access APN data 306 to determine whether a subscriber is associated with an appropriate APN. If an APN associated with the subscriber is not in the blacklist, the ARP may be allowed.

It will be appreciated that the above description is for illustrative purposes and that SP 108 may include additional and/or different modules or components.

Figure 4:
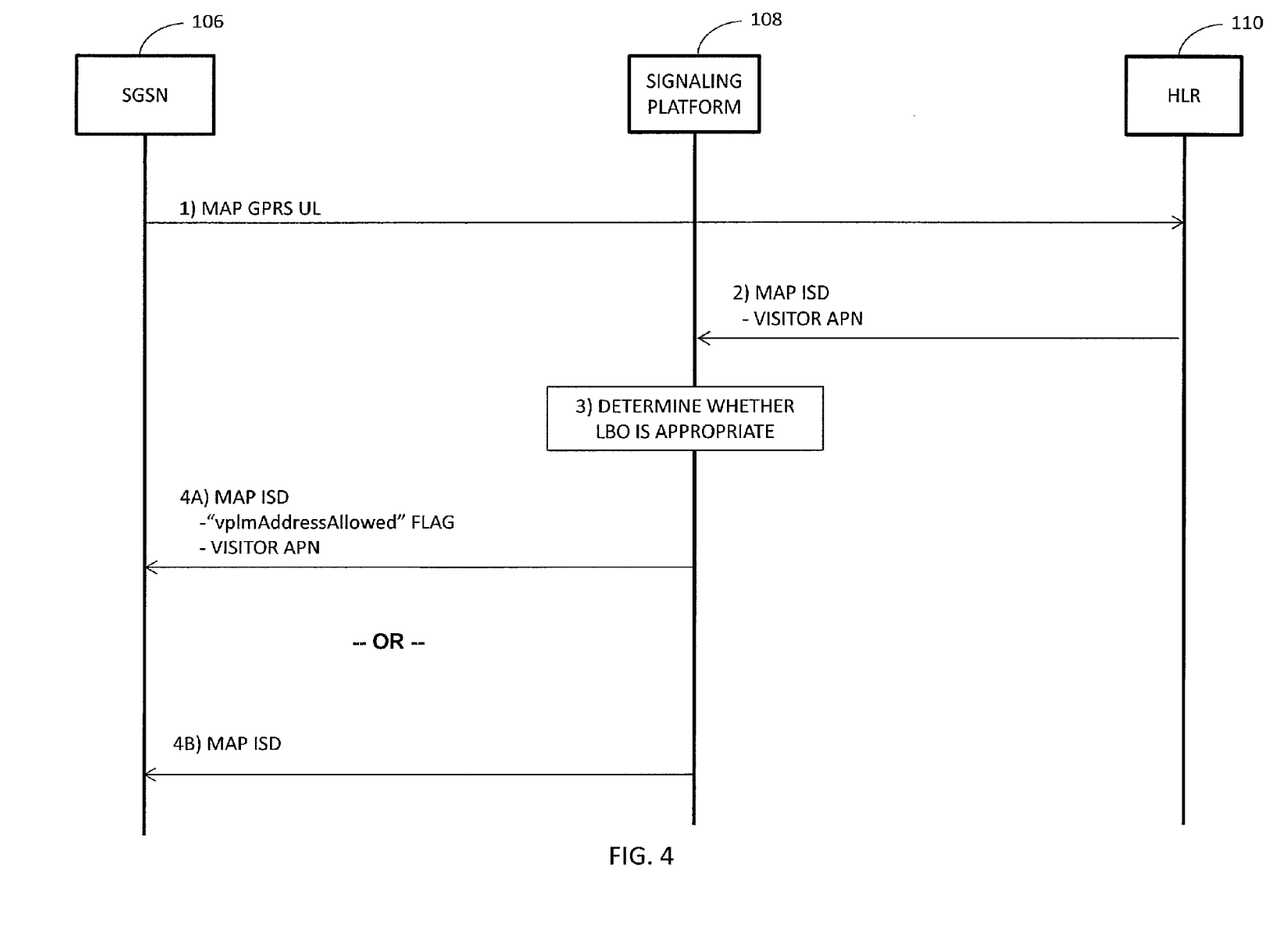
FIG. 4 is a diagram illustrating exemplary mobile application part (MAP) messages associated with supporting LBO according to an embodiment of the subject matter described herein.

FIG. 4 is a diagram illustrating exemplary MAP messages associated with supporting LBO according to an embodiment of the subject matter described herein. In the embodiment illustrated in FIG. 4, LRO- and/or ARP-related information may be initially provided or set by HLR 110 and SP 108 may modify, add, or delete LRO- and/or ARP-related information depending on various factors. In some embodiments, SP 108 may include LBO module 302 and be configured to analyze signaling messages between nodes of a home network (HLR 110) and nodes of a visited network (SGSN 106).

At step 1, a MAP GPRS UL message may be sent from SGSN 106 to HLR 110. The MAP GPRS UL message may include information for updating the current location of UE 102. HLR 110 may receive the MAP GPRS UL message and use information in the message to retrieve subscriber data. HLR 110 may then generate a MAP ISD message.

In some embodiments, HLR 110 may generate a message that includes a flag or parameter indicating that an ARP (e.g., a provider or potential provider of LBO service) is allowed to provide or perform an LBO service, e.g., a 'VPLMN Address Allowed' flag set to '19'. In some embodiments, a generated message may also include an APN or other information associated with a roaming provider or ARP, thereby indicating that an ARP is allowed to provide or perform an LBO service.

In some embodiments, HLR 110 may generate a message that includes no flag or parameter, thereby indicating that an LBO service is not allowed. In some embodiments, a generated message may also include an APN or other information associated with a subscriber's home network, thereby indicating that an LBO service is not allowed in the visited network.

At step 2, a MAP ISD message may be received at SP 108. For example, SP 108 may be an STP or a signaling router. In this example, SP 108 may be configured to route or forward the signaling message to its intended destination. The MAP ISD message may include subscriber data, including an APN associated with an ARP and a flag (e.g., a 'VPLMN Address Allowed' flag) indicating that LBO service provided by an ARP is allowed.

At step 3, it may be determined whether the ARP or roaming provider is appropriate for providing or performing an LBO service. For example, SP 108 or LBO module 302 may check an APN and determine that the APN is associated with a non-EU nation. In this example, SP 108 may determine that the ARP is prohibited. In another example, SP 108 or LBO module 302 may check an APN and determine that the APN is associated with an EU nation and that the home network is also associated with an EU nation. In this example, SP 108 may determine that the ARP is allowed.

At step 4A, if SP 108 determines the ARP is allowed (e.g., not prohibited) to provide or perform an LBO service, a MAP ISD message may be sent to SGSN 106. In some embodiments, the sent MAP ISD message may be substantially the same as the MAP ISD message received by SP 108. For example, the sent MAP ISD message may include the same LBO- and/or ARP-related information as in the signaling message of step 2.

At step 4B, if SP 108 determines the ARP is not allowed to provide or perform an LBO service, a MAP ISD message may be sent to SGSN 106. In some embodiments, the sent MAP ISD message may not include LBO- and/or ARP-related information. In some embodiments, the sent MAP ISD message may include modified LBO- and/or ARP-related information. For example, the sent MAP ISD message may include a flag indicating that an ARP is not allowed to provide or perform an LBO service and/or an APN associated with a subscriber's home network.

Figure 5:
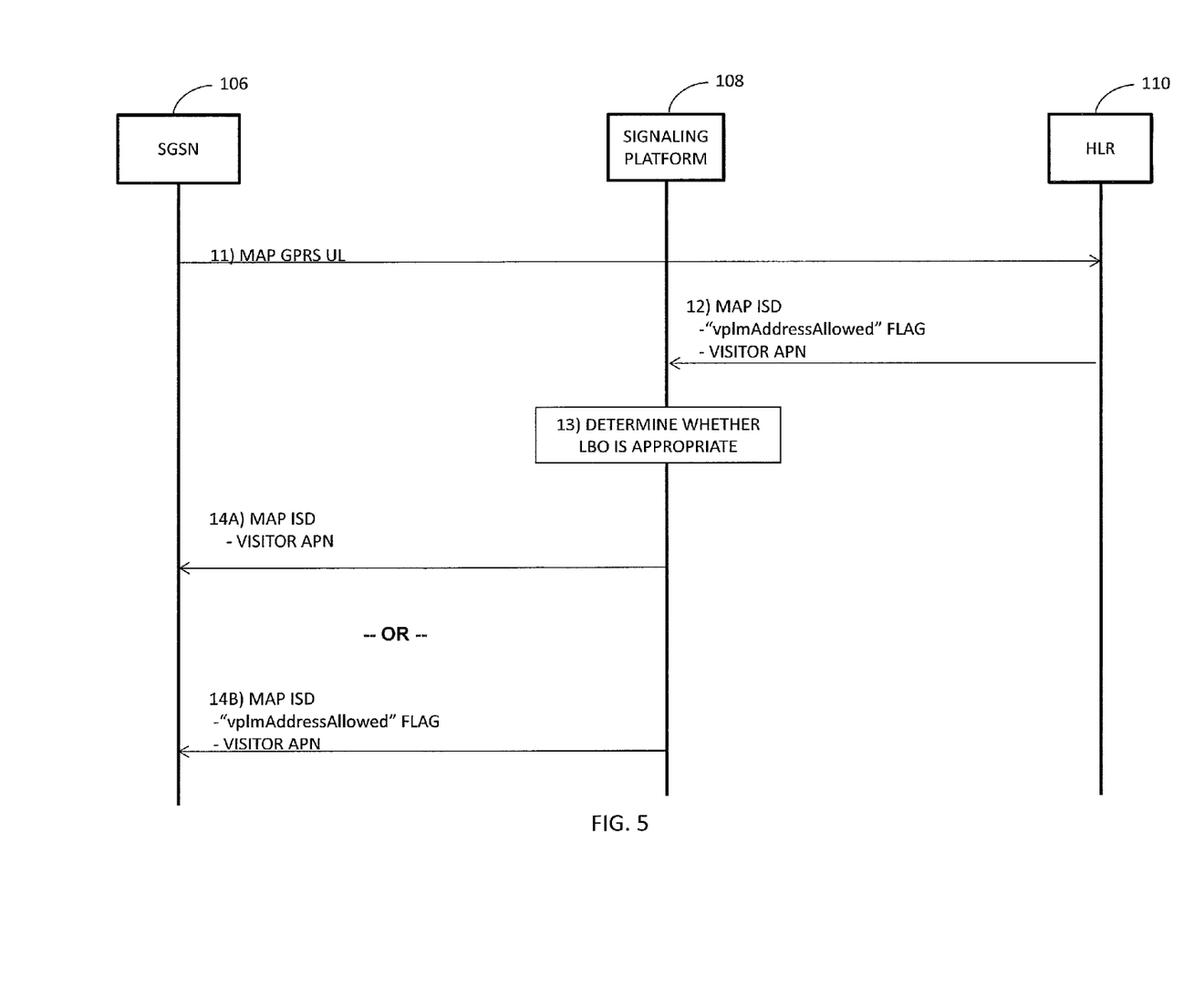
FIG. 5 is a diagram illustrating exemplary MAP messages associated with supporting LBO according to another embodiment of the subject matter described herein.

FIG. 5 is a diagram illustrating exemplary messages associated with supporting LBO according to another embodiment of the subject matter described herein. In the embodiment illustrated in FIG. 5, LRO- and/or ARP-related information may be provided or set by SP 108 depending on various factors. In some embodiments, SP 108 may include LBO module 302 and be configured to analyze signaling messages between nodes of a home network (HLR 110) and nodes of a visited network (SGSN 106).

At step 11, a MAP GPRS UL message may be sent from SGSN 106 to HLR 110. The MAP GPRS UL message may include information for updating the current location of UE 102. HLR 110 may receive the MAP GPRS UL message and use information in the message to retrieve subscriber data. HLR 110 may then generate a MAP ISD message.

At step 12, a MAP ISD message may be received at SP 108. For example, SP 108 may be an STP or a signaling router. In this example, SP 108 may be configured to route or forward the signaling message to its intended destination. The MAP ISD message may include subscriber data.

At step 13, it may be determined whether an ARP or roaming provider is appropriate for providing or performing an LBO service. For example, SP 108 or LBO module 302 may use information in the signaling message, such as header information and subscriber data, to determine whether the subscriber should be allowed to use an ARP or roaming provider to perform an LBO service. In this example, SP 108 may determine whether an ARP is appropriate to provide or perform an LBO service by determining if the roaming subscriber's home network and the visited network are both associated with an EU nation or whether the two networks have a service agreement.

At step 14A, if SP 108 determines an ARP is not appropriate to provide or perform an LBO service, a MAP ISD message may be sent to SGSN 106. For example, if SP 108 determines that a destination address or an APN are not appropriate, SP 108 may delete a "vplmAddressAllowed" Flag from the message and LBO service cannot be provided in the visited network. In this example, there is no need to delete the visitor APN because without the "vplmAddressAllowed" Flag present LBO service may not be allow by the visited network.

In some embodiments, the sent MAP ISD message may include LBO- and/or ARP-related information. For example, SP 108 may set a flag in the sent MAP ISD message to indicate that an ARP is allowed, e.g., a 'VPLMN Address Allowed' flag set to '19' and/or may add an APN associated with the ARP.

At step 14B, if SP 108 determines an ARP is appropriate to provide or perform an LBO service, a MAP ISD message may be sent to SGSN 106. For example, if SP 108 determines that both a destination address and an APN are appropriate, SP 108 may not modify the MAP ISD message and LBO service can be provided in the visited network.

In some embodiments, the sent MAP ISD message may include LBO- and/or ARP-related information. In some embodiments, SP 108 may set a flag in the sent MAP ISD message to indicate that an ARP is allowed and/or may include an APN provided by a subscriber's home network. In some embodiments, the sent MAP ISD message may be substantially the same as the MAP ISD message received by SP 108. For example, the sent MAP ISD message may include the same LBO- and/or ARP-related information as in the signaling message of step 12.

Figure 6:
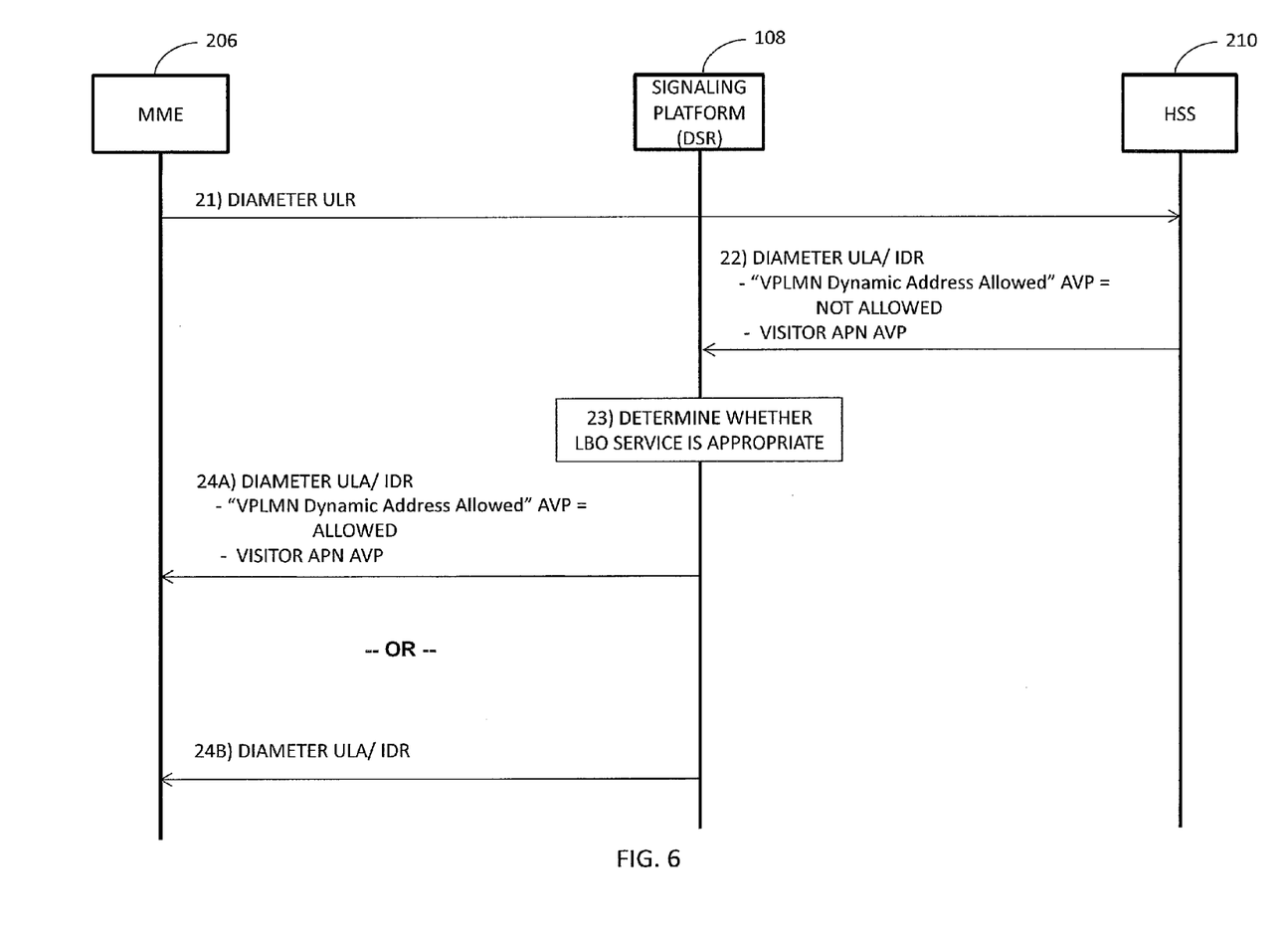
FIG. 6 is a diagram illustrating exemplary Diameter messages associated with supporting LBO according to an embodiment of the subject matter described herein.

FIG. 6 is a diagram illustrating exemplary Diameter messages associated with supporting LBO according to an embodiment of the subject matter described herein. In the embodiment illustrated in FIG. 6, LBO- and/or ARP-related information may be initially provided or set by HSS 210 and SP 108 may modify, add, or delete LBO- and/or ARP-related information depending on various factors. In some embodiments, SP 108 may include LBO module 302 and be configured to analyze signaling messages between nodes of a home network (HSS 210) and nodes of a visited network (MME 206).

At step 21, a Diameter Update-Location-Request (ULR) message may be sent from MME 206 to HSS 210. The Diameter ULR message may include information for updating the current location of UE 102. HSS 210 may receive the Diameter ULR message and use information in the message to retrieve subscriber data. HSS 210 may then generate a Diameter Update-Location-Answer (ULA) message and/or a Diameter Insert-Data-Request (IDR).

In some embodiments, HSS 210 may generate a message that includes an AVP or parameter indicating that an ARP (e.g., a provider or potential provider of LBO service) is allowed to provide or perform an LBO service, e.g., a 'VPLMN Dynamic Address Allowed' AVP with a 'VPLMN-Dynamic-Address-Allowed' portion: set to 'Allowed' or '1'. In some embodiments, a generated message may also include an APN or other information associated with a roaming provider or ARP, thereby indicating that an ARP is allowed to provide or perform an LBO service.

In some embodiments, HSS 210 may generate a message that includes an AVP or parameter indicating that an ARP is not allowed to provide or perform an LBO service, e.g., a 'VPLMN Dynamic Address Allowed' AVP with a 'VPLMN-Dynamic-Address-Allowed' portion: set to 'NotAllowed' or '0'. In some embodiments, a generated message may also include an APN or other information associated with a subscriber's home network, thereby indicating that an ARP is not allowed to provide or perform an LBO service.

At step 22, a Diameter ULA or IDR message may be received at SP 108. For example, SP 108 may be a Diameter node, a DRA, or DSR. In this example, SP 108 may be configured to route or forward the Diameter signaling message to its intended destination. The Diameter ULA or IDR message may include subscriber data, including an APN associated with an ARP and an AVP (e.g., a 'VPLMN Dynamic Address Allowed' AVP) indicating that an ARP is not allowed to provide or perform an LBO service.

At step 23, it may be determined whether the ARP or roaming provider is appropriate for performing an LBO service. For example, SP 108 or LBO module 302 may check an APN and determine that the APN is associated with a non-EU nation. In this example, SP 108 may determine that the ARP is not allowed to provide or perform an LBO service. In another example, SP 108 or LBO module 302 may check an APN and determine that the APN is associated with an EU nation and that the home network is also associated with an EU nation. In this example, SP 108 may determine that the ARP is allowed to provide or perform an LBO service.

In some embodiments, SP 108 may include DSR functionality and may use DSR rules engine or related functionality to analyze and compare information in AVPs or other portions of a received Diameter message. For example, SP 108 may be configured to compare a VPLMN or network identifier found in a destination realm AVP (e.g., AVP 283) in a Diameter ULA or IDR message with VPLMNs or network identifiers contained in an LBO-VPLMN whitelist. In another example, SP 108 may be configured to compare one or more APNs stored in a Diameter ULA or IDR message with entries in an LBO-APN whitelist. In this example, the APN may be found in an APN-Configuration AVP (e.g., AVP 1430) and/or a Service-Selection AVP (e.g., AVP 493).

In some embodiments, if both a VPLMN and an APN are found in whitelists and a 'VPLMN Dynamic Address Allowed' AVP is set to 'Allowed', then SP 108 may be configured to route the Diameter ULA or IDR message unchanged to a destination. In some embodiments, if both a VPLMN and an APN are found in whitelists and a 'VPLMN Dynamic Address Allowed' AVP is not present or not set to 'Allowed' then SP 108 may be configured to set the 'VPLMN Dynamic Address Allowed' AVP to 'Allowed' and may route the ULA or IDR message to a destination. In some embodiments, if one or more of a VPLMN and an APN is not found in a whitelist, then SP 108 may be configured to set the 'VPLMN Dynamic Address Allowed' AVP to 'NotAllowed' and may route the ULA or IDR message to a destination.

At step 24A, if SP 108 determines the ARP is allowed to provide or perform an LBO service, a Diameter ULA or IDR message may be sent to MME 206. In some embodiments, the sent Diameter ULA or IDR message may include modified LBO- and/or ARP-related information (e.g., control information for performing an LBO service). For example, the sent Diameter ULA or IDR message may modify a 'VPLMN Dynamic Address Allowed' AVP to indicate that the ARP is allowed to perform an LBO service.

At step 24B, if SP 108 determines the ARP is not allowed to provide or perform an LBO service, a Diameter ULA/IDR message may be sent to MME 206. In some embodiments, the sent Diameter ULA/IDR message may not include LBO- and/or ARP-related information. In some embodiments, the sent Diameter ULA/IDR message may include modified LBO- and/or ARP-related information. For example, the sent Diameter ULA/IDR message may include an AVP indicating that an ARP is not allowed to provide or perform an LBO service and/or may include an APN associated with a subscriber's home network.

Figure 7:
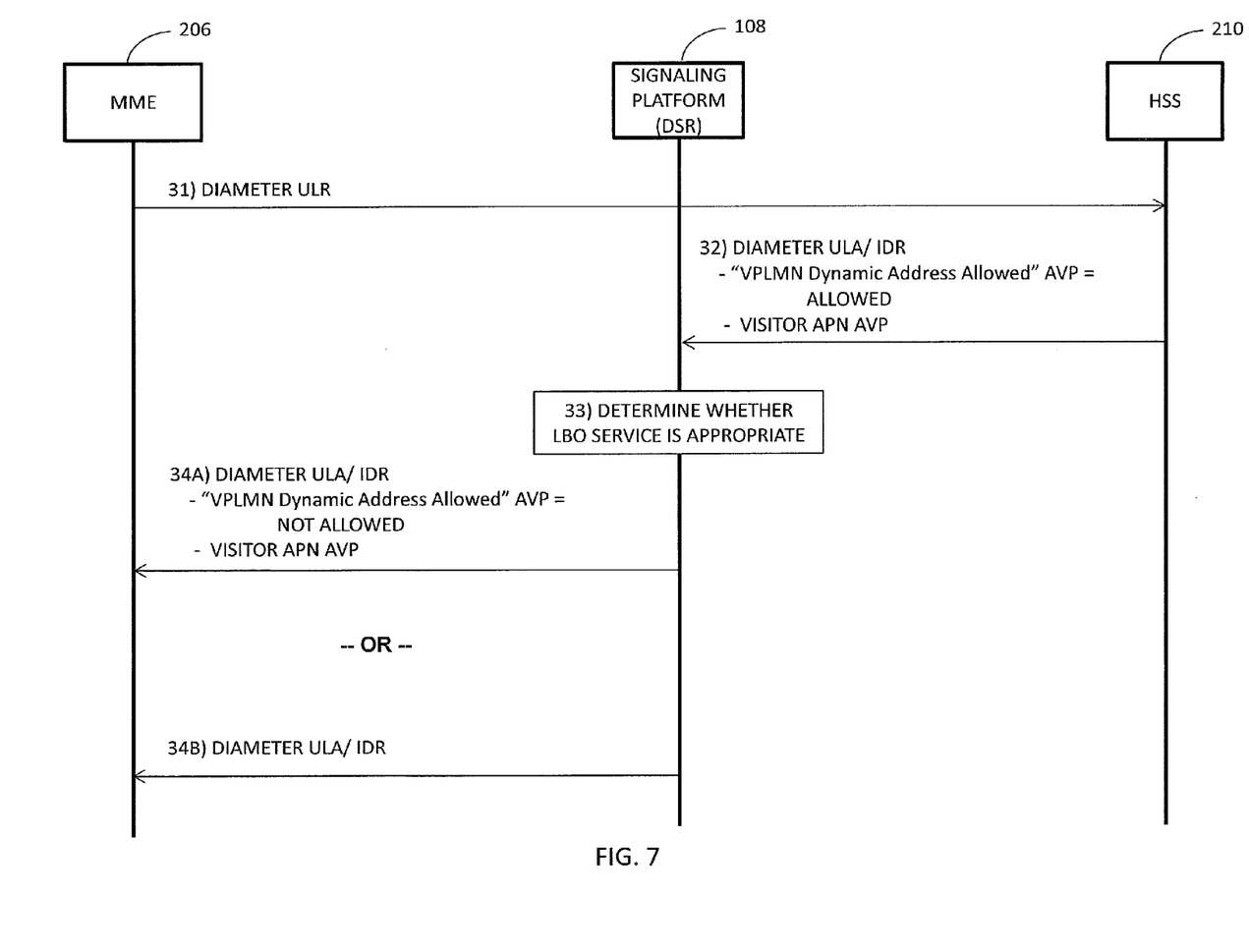
FIG. 7 is a diagram illustrating exemplary Diameter messages associated with supporting LBO according to another embodiment of the subject matter described herein.

FIG. 7 is a diagram illustrating exemplary Diameter messages associated with supporting LBO according to another embodiment of the subject matter described herein. In the embodiment illustrated in FIG. 7, LRO- and/or ARP-related information may be initially provided or set by HSS 210 and SP 108 may modify, add, or delete LRO- and/or ARP-related information depending on various factors. In some embodiments, SP 108 may include LBO module 302 and be configured to analyze signaling messages between nodes of a home network (HSS 210) and nodes of a visited network (MME 206).

At step 31, a Diameter ULR message may be sent from MME 206 to HSS 210. The Diameter ULR message may include information for updating the current location of UE 102. HSS 210 may receive the Diameter ULR message and use information in the message to retrieve subscriber data. HSS 210 may then generate a Diameter ULA and/or IDR message.

In some embodiments, HSS 210 may generate a message that includes an AVP or parameter indicating that an ARP is not allowed to provide or perform an LBO service, e.g., a 'VPLMN Dynamic Address Allowed' AVP with a 'VPLMN-Dynamic-Address-Allowed' portion: set to 'NotAllowed' or '0'. In some embodiments, a generated message may also include an APN or other information associated with a roaming provider or ARP, thereby indicating that an ARP is allowed to provide or perform an LBO service.

In some embodiments, HSS 210 may generate a message that includes an AVP or parameter indicating that an ARP is allowed to provide or perform an LBO service, e.g., a 'VPLMN Dynamic Address Allowed' AVP with a 'VPLMN-Dynamic-Address-Allowed' portion: set to 'Allowed' or '10'. In some embodiments, a generated message may also include an APN or other information associated with a subscriber's home network, thereby indicating that an ARP is not allowed to provide or perform an LBO service.

At step 32, a Diameter ULA/IDR message may be received at SP 108. For example, SP 108 may be a Diameter node, a DRA, or DSR. In this example, SP 108 may be configured to route or forward the Diameter signaling message to its intended destination. The Diameter ULA/IDR message may include subscriber data, including an APN associated with an ARP and an AVP (e.g., a 'VPLMN Dynamic Address Allowed' AVP) indicating that an ARP is allowed to provide or perform an LBO service.

At step 33, it may be determined whether the ARP or roaming provider is appropriate for performing an LBO service. For example, SP 108 or LBO module 302 may check an APN and determine that the APN is associated with a non-EU nation. In this example, SP 108 may determine that the ARP is not allowed to provide or perform an LBO service. In another example, SP 108 or LBO module 302 may check an APN and determine that the APN is associated with an EU nation and that the home network is also associated with an EU nation. In this example, SP 108 may determine that the ARP is allowed to provide or perform an LBO service.

In some embodiments, SP 108 may include DSR functionality and may use DSR rules engine or related functionality to analyze and compare information in AVPs or other portions of a received Diameter message. For example, SP 108 may be configured to compare a VPLMN or network identifier found in a destination realm AVP (e.g., AVP 283) in a Diameter ULA/IDR message with VPLMNs or network identifiers contained in an LBO-VPLMN whitelist. In another example, SP 108 may be configured to compare one or more APNs stored in a Diameter ULA/IDR message with entries in an LBO-APN whitelist. In this example, the APN may be found in an APN-Configuration AVP (e.g., AVP 1430) and/or a Service-Selection AVP (e.g., AVP 493).

In some embodiments, if both a VPLMN and an APN are found in whitelists and a 'VPLMN Dynamic Address Allowed' AVP is set to 'Allowed', then SP 108 may be configured to route the Diameter ULA/IDR message unchanged to a destination. In some embodiments, if both a VPLMN and an APN are found in whitelists and a 'VPLMN Dynamic Address Allowed' AVP is not present or not set to 'Allowed' then SP 108 may be configured to set the 'VPLMN Dynamic Address Allowed' AVP to 'Allowed' and may route the ULA/IDR message to a destination. In some embodiments, if one or more of a VPLMN and an APN is not found in a whitelist, then SP 108 may be configured to set the 'VPLMN Dynamic Address Allowed' AVP to 'NotAllowed' and may route the ULA/IDR message to a destination.

At step 34A, if SP 108 determines the ARP is not allowed to provide or perform an LBO service, a Diameter ULA/IDR message may be sent to MME 206. In some embodiments, the sent Diameter ULA/IDR message may include modified LBO- and/or ARP-related information. For example, the sent Diameter ULA/IDR message may modify a 'VPLMN Dynamic Address Allowed' AVP to indicate that the ARP is not allowed to provide or perform an LBO service.

At step 34B, if SP 108 determines the ARP is allowed to provide or perform an LBO service, a Diameter ULA/IDR message may be sent to MME 206. In some embodiments, the sent Diameter ULA/IDR message may be substantially the same as the Diameter ULA/IDR message received by SP 108. For example, the sent Diameter ULA/IDR message may include the same LBO- and/or ARP-related information as in the signaling message of step 32.

Figure 8:
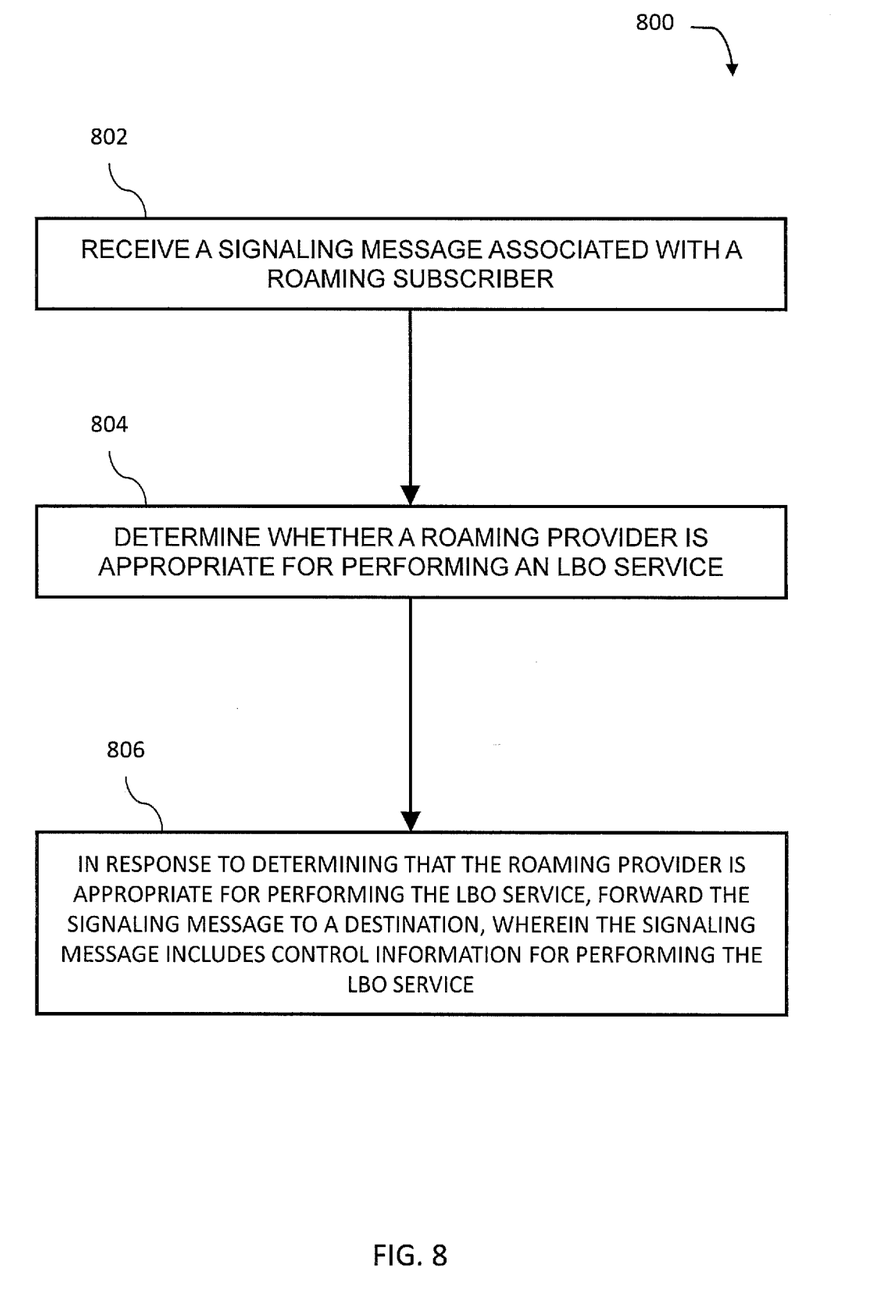
FIG. 8 is a diagram illustrating an exemplary process for supporting LBO according to an embodiment of the subject matter described herein.

FIG. 8 is a diagram illustrating an exemplary process 800 for supporting LBO according to an embodiment of the subject matter described herein. In some embodiments, exemplary process 800 described herein, or portions thereof, may be performed at or performed by SP 108, LBO module 302, and/or another module or node.

Referring to the embodiment illustrated in FIG. 8, exemplary process 800 starts at 802. At step 802, a signaling message may be received. The signaling message may be associated with a roaming subscriber. For example, the signaling message may be associated with LBO- and/or ARP-related information and/or subscriber data. In some embodiments, a signaling message may include a MAP message, a MAP ISD message, a Diameter message, a Diameter IDR message, or a Diameter ULA message.

In some embodiments, a received signaling message may originate from HLR 110 or HSS 210. In some embodiments, LBO- and/or ARP-related information may include one or more parameters or AVPs. Exemplary parameter or AVP data may include an APN, a network identifier, an operator identifier, a location identifier, a destination realm, a destination host, a origination realm, a origination host, a country identifier, or a flag indicating whether an address associated with a visited network is allowed.

At step 804, it may be determined whether the roaming provider is appropriate for providing or performing an LBO service. In some embodiments, determining whether a roaming provider is appropriate for performing an LBO service may include identifying an APN associated with the roaming provider and performing a lookup in a database using the APN. For example, a database may include a whitelist of appropriate providers or a blacklist of inappropriate providers indexed by APNs.

At step 806, in response to determining that the roaming provider may be appropriate for providing or performing the LBO service, the signaling message or a second signaling message based on the signaling message may be forwarded to a destination and the signaling message or the second signaling message may include information about the roaming provider. For example, information may include control information for performing an LBO service, such as policy rules or other information.

In some embodiments, determining that a roaming provider is appropriate for providing or performing an LBO service may include determining a visited network location based on an APN or other information stored in the parameter.

In some embodiments, determining that a roaming provider is not appropriate for providing or performing an LBO service includes determining that a home mobile network is allowed to prohibit the roaming provider. For example, a mobile network operating in an EU nation (e.g., Germany) may prohibit an ARP when its subscriber is roaming in a non-EU nation (e.g., United States of America or Canada).

In some embodiments, forwarding a signaling message may include adding a parameter, deleting a parameter, modifying a parameter, adding an AVP, deleting an AVP, modifying an AVP, changing a flag indicating whether an address associated with a visited network is allowed, changing a flag to indicate that the address associated with a visited network is prohibited or not allowed, changing a flag value from true to false, or changing a flag value from false to true.

In some embodiments, in response to the determining that a roaming provider is not appropriate for providing or performing an LBO service, a signaling message may be forwarded to a destination, where the signaling message does not include information about the roaming provider. For example, in response to determining that an ARP is not allowed, an ARP-related parameter in a signaling message may be deleted. In another example, an ARP-related parameter in a signaling message may be modified to indicate a subscriber's home network.

In some embodiments, determining that a roaming provider is appropriate for providing or performing an LBO service may include determining that a home mobile network is not allowed to prohibit the roaming provider from providing or performing an LBO service. For example, a mobile network operating in an EU nation (e.g., Germany) may allow an ARP (e.g., because of laws or other reasons) when its subscriber is roaming in another EU nation (e.g., France).

It will appreciated that while some aspects of the subject matter described herein has been discussed with reference to SS7 and Diameter based mobile networks (2G, 3G, 4G, LTE, EPC/EPS), various other networks may utilize some aspects of the subject matter described herein. For example, any network that utilize signaling messages and/or includes a signaling message routing node may use features, mechanisms and techniques described herein to support LBO for roaming subscribers.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for supporting local breakout (LBO), the method comprising:
at a signaling platform:
receiving, from a home subscriber server (HSS) or home location register (HLR), a signaling message associated with a roaming subscriber, wherein the signaling message includes a Diameter Insert-Subscriber-Data-Request (IDR) message, a Diameter Update-Location-Answer (ULA) message, or a mobile application part (MAP) insert subscriber data (ISD) message;
determining, using the signaling message, whether a roaming provider is appropriate for performing an LBO service, wherein determining whether the roaming provider is appropriate for performing the LBO service includes identifying an access point name and performing a lookup in a database using the access point name;
in response to determining that the roaming provider is appropriate for performing the LBO service, modifying the signaling message to include control information for performing the LBO service and, after modifying the signaling message, forwarding the signaling message to a destination; and
in response to the determining that the roaming provider is not appropriate for performing the LBO service, forwarding the signaling message to a destination, wherein the signaling message does not include control information for performing the LBO service.

2. The method of claim 1 wherein determining that the roaming provider is appropriate for performing the LBO service includes determining that LBO service is allowed in a visited network.

3. The method of claim 1 wherein determining that the roaming provider is not appropriate for performing the LBO service includes determining that the LBO service is not allowed in a visited network.

4. The method of claim 1 wherein determining whether the roaming provider is appropriate for performing the LBO service includes determining a visited network location based on an access point name or information stored in an access point name parameter.

5. The method of claim 1 wherein the destination includes a mobility management element (MME), a node in a visited network, a serving general packet radio service (GPRS) support node (SGSN), an SGSN in a visited network, or a gateway.

6. The method of claim 1 wherein the signaling platform includes a Diameter node, a Diameter routing agent, a Diameter signaling router, a gateway, a signaling router, a signal transfer point (STP), a signaling gateway (SG), a signaling system number 7 (SS7) node, or a signaling node.

7. The method of claim 1 wherein forwarding the signaling message includes adding a parameter, deleting a parameter, modifying a parameter, adding an attribute value pair (AVP), deleting an AVP, modifying an AVP, changing a flag indicating that LBO service in a visited network is allowed, changing a flag to indicate that LBO service in a visited network is not allowed, changing a flag value from true to false, or changing a flag value from false to true.

8. The method of claim 7 wherein the parameter or the AVP includes an access point name, a destination realm or host, an originating realm or host, a network identifier, a location identifier, a country identifier, or a flag indicating whether an address associated with a visited network is allowed.

9. A system for supporting local breakout (LBO), the system comprising:
at a signaling platform comprising at least one processor and memory, the signaling platform comprising:
an LBO module configured to receive, from a home subscriber server (HSS) or home location register (HLR), a signaling message associated with a roaming subscriber, wherein the signaling message includes a Diameter Insert-Subscriber-Data-Request (IDR) message, a Diameter Update-Location-Answer (ULA) message, or a mobile application part (MAP) insert subscriber data (ISD) message, to determine, using the signaling message, whether a roaming provider is appropriate for performing an LBO service, wherein determining whether the roaming provider is appropriate for performing the LBO service includes identifying an access point name and performing a lookup in a database using the access point name; in response to determining that the roaming provider is appropriate for performing the LBO service, modify the signaling message to include control information for performing the LBO service and, after modifying the signaling message, forward the signaling message to a destination; and in response to the determining that the roaming provider is not appropriate for performing the LBO service, forward the signaling message to a destination, wherein the signaling message does not include control information for performing the LBO service.

10. The system of claim 9 wherein determining that the roaming provider is not appropriate for performing the LBO service includes determining that the roaming subscriber cannot use LBO service in a visited network.

11. The system of claim 9 determining whether the roaming provider is appropriate for performing an LBO service includes determining a visited network location based on an access point name or information stored in an access point name parameter.

12. The system of claim 9 wherein the destination includes a mobility management element (MME), a node in a visited network, a serving general packet radio service (GPRS) support node (SGSN), an SGSN in a visited network, or a gateway.

13. The system of claim 9 wherein the signaling platform includes a Diameter node, a Diameter routing agent, a Diameter signaling router, a gateway, a signaling router, a signal transfer point (STP), a signaling gateway (SG), a signaling system number 7 (SS7) node, or a signaling node.

14. The system of claim 9 wherein forwarding the signaling message includes adding a parameter, deleting a parameter, modifying a parameter, modifying a parameter, adding an attribute value pair (AVP), deleting an AVP, modifying an AVP, changing a flag indicating whether an address associated with a visited network is allowed, changing a flag to indicate that the address associated with LBO service in a visited network is not allowed, changing a flag value from true to false, or changing a flag value from false to true.

15. The system of claim 14 wherein the parameter includes an access point name, a network identifier, a destination realm or host, a origination realm or host, a location identifier, a country identifier, or a flag indicating whether an address associated with a visited network is allowed.

16. A non-transitory computer readable medium having stored thereon executable instructions that when executed by a processor of a computer control the computer to perform steps comprising:

at a signaling platform:

receiving, from a home subscriber server (HSS) or home location register (HLR), a signaling message associated with a roaming subscriber, wherein the signaling message includes a Diameter Insert-Subscriber-Data-Request (IDR) message, a Diameter Update-Location-Answer (ULA) message, or a mobile application part (MAP) insert subscriber data (ISD) message;

determining, using the signaling message, whether a roaming provider is appropriate for performing an LBO service, wherein determining whether the roaming provider is appropriate for performing the LBO service includes identifying an access point name and performing a lookup in a database using the access point name;

in response to determining that the roaming provider is appropriate for performing the LBO service, modifying the signaling message to include control information for performing the LBO service and, after modifying the signaling message, forwarding the signaling message to a destination; and in response to the determining that the roaming provider is not appropriate for performing the LBO service, forward the signaling message to a destination, wherein the signaling message does not include control information for performing the LBO service.

* * * * *